United States Patent Office 3,098,631
Patented July 23, 1963

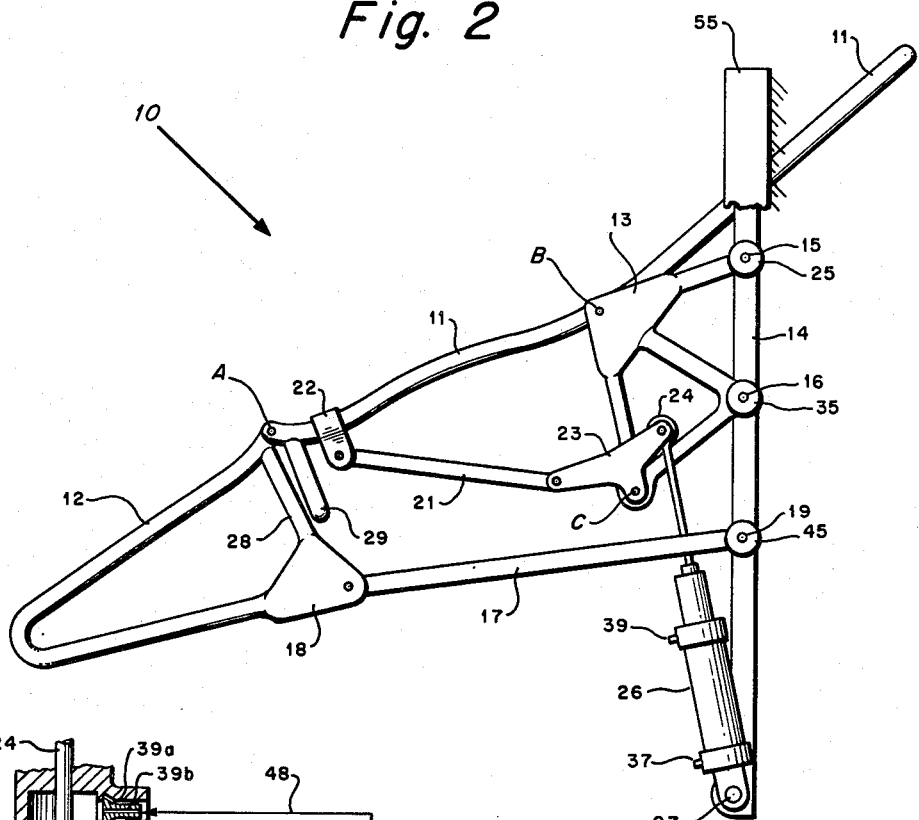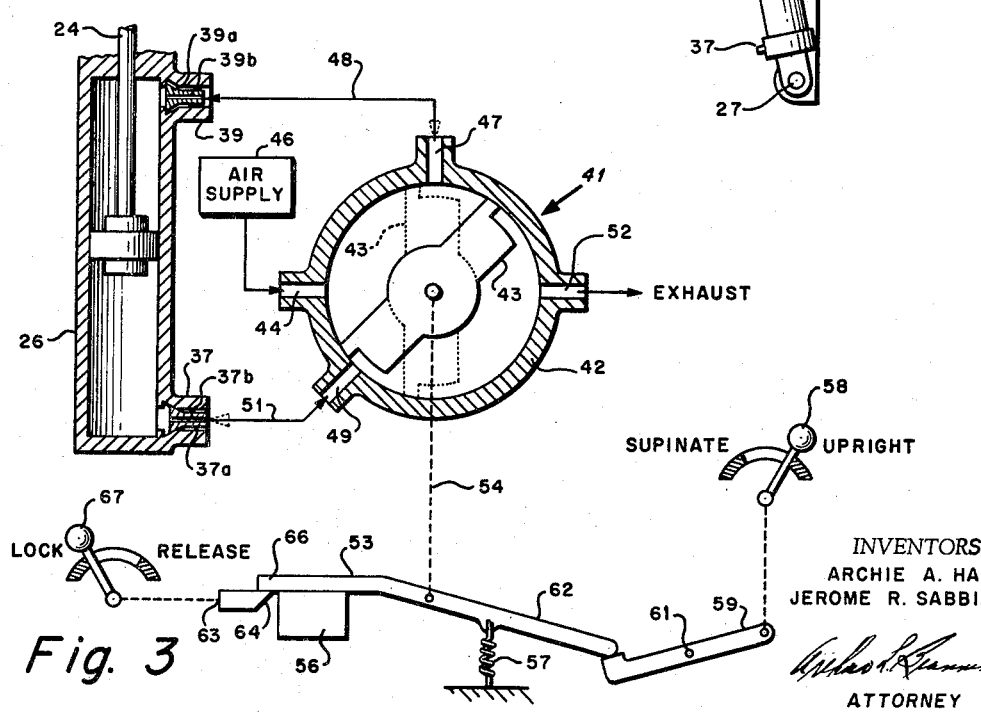

3,098,631
SUPINATING PILOT'S SEAT
Archie A. Hall and Jerome R. Sabbia, Dallas, Tex., assignors, by mesne assignments, to the United States of America as represented by the Secretary of the Navy
Filed Dec. 22, 1961, Ser. No. 161,754
11 Claims. (Cl. 244—122)

This invention relates to a pilot's seat and more particularly to a supinating pilot's seat and a control system therefor for use in supersonic aircraft.

The introduction of the integrated flight capsule type of cockpit in supersonic aircraft has eliminated the need for ejection seats used for pilot escape because the flight capsule, itself, is an escape system. The chief advantage of the integrated flight capsule cockpit is the elimination of the necessity for a helmeted flight suit which acts as an oxygen mask, communicating system, and body warmer. A major function of the flight suit is, of course, to combat blackout resulting from "G" forces acting on the pilot's body during high accelerations.

Since the integrated flight capsule greatly improves the environment to which the pilot is subjected, actual removal of the flight suit to unburden the pilot from its confinement and thus enable him to take advantage of the improved environment is a prime objective. However, before removal of the flight suit is justified, some other means of combating blackout due to excessive "G" forces must be found.

One method of accomplishing blackout protection is the placing of the pilot in a supine position during high accelerations.

The present invention contemplates a supinating pilot's seat for use in the cockpit of an integrated flight capsule, which gives the pilot the same protection from blackout as the pressurized flight suit now used, and at the same time is consistent with the surroundings normally found in the cockpit of advanced types of supersonic aircraft.

Aside from providing adequate blackout protection for pilots the supinating seat of the present invention was designed with attention to weight, comfort, durability, and physical size of pilots.

Maintenance of the standard 11% downward vision over the cowl is accomplished by selecting a point near the pilot's shoulder for rotation of the seat to the supinating position in which the pilot is placed in a supine position which has a displacement of 65° from the normal or upright position.

The control system for actuating the seat to and from the supinating position which forms an important part of this invention is automatically put into operation at a predetermined acceleration or may be manually operated.

Therefore, it is an object of the present invention to provide a supinating pilot's seat for protection against pilot blackout due to high accelerations.

Another object of the present invention is to provide a supinating pilot's seat and control system therefor which is capable of rapid transition to the supinating or upright positions from the upright or supinating positions and of smooth starting and stopping from the extreme positions.

A further object of the present invention is to provide a pilot's seat which may be automatically actuated to the supinating position at a predetermined aircraft acceleration or which may be manually actuated.

Still another object of the present invention is to provide a supinating seat control system which is automatically responsive at a predetermined acceleration for actuating a pilot's seat to or from a supinating position.

Other objects and many of the attendant advantages of this invention will be readily appreciated as the same becomes better understood by reference to the following detailed description when considered in connection with the accompanying drawings in which like reference numerals designate like parts throughout the figures thereof and in which:

FIG. 2 shows the seat of FIG. 1 in the pilot supinating position; and

FIG. 3 is a schematic representation of the control system of the present invention.

Figure 1:
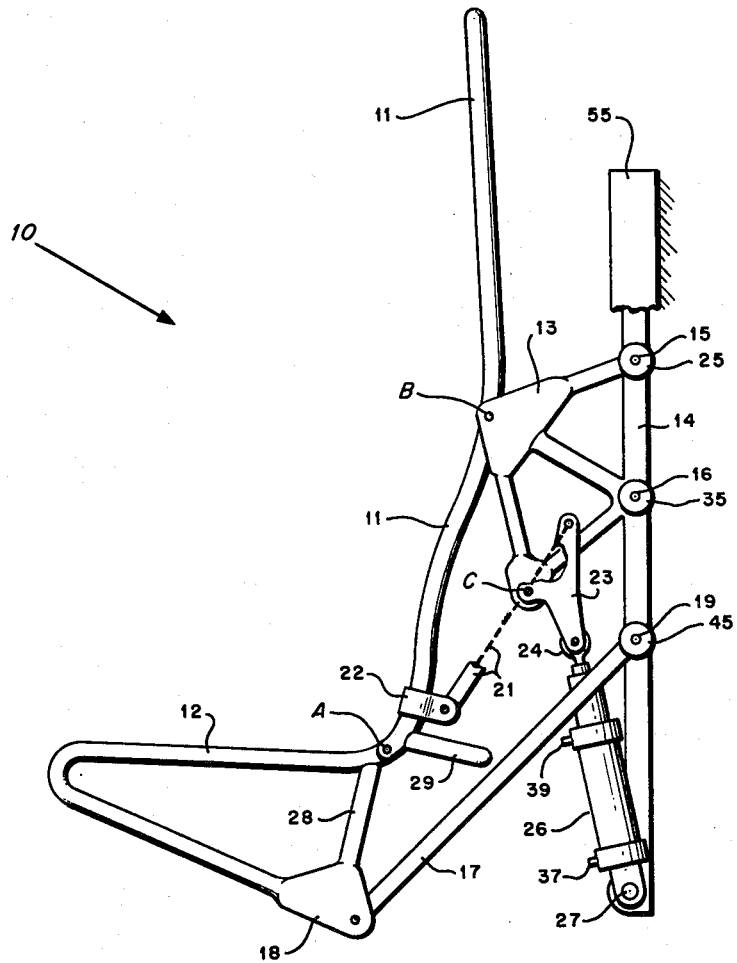
FIG. 1 shows a side view of the supinating pilot's seat of the present invention in the normal position.

Referring now to FIG. 1 there is shown the supinating pilot's seat 10 in the upright or normal position.

The seat itself consists of a back portion 11 and a seat portion 12 pivotally connected at point A. The seat portion 11 is contoured to fit the natural S curve of the human back. The seat may be of the tubular frame type with wire mesh connected between parallel frame portions for flexibly supporting the body.

The seat is mounted for rotation about fixed pivot point B. Pivot point B is chosen to be near the shoulders of a pilot seated in the seat so that on rotating the seat 65° from the normal position shown in FIG. 1 to the supinating position shown in FIG. 2 the pilot's normal 11° vision over the cowl is maintained and his view of the instrument panel remains undiminished.

Rigid frame member 13 establishes fixed pivot point B about which the seat is rotated to the supinating position and fixed pivot point C the function of which is to be more fully explained hereinbelow. Rigid frame member 13 is secured to vertical support plate 14 as at points 15 and 16.

Seat portion 12 is pivotally secured to one end of mechanical follower linkage 17 at joint member 18. The other end of mechanical linkage 17 is pivotally connected to plate 14 at point 19.

Points 15, 16, and 19 may be provided with rollers 25, 35, and 45 which together with track element 55 enable the height of seat 10 to be adjusted.

Back portion 11 is pivotally secured intermediate of its ends at fixed pivot point B. The elevation of point B is laterally fixed relative to vertical support plate 14.

A clamp 22 secured near the lower end of back portion 11 is pivotally connected to one end of connecting rod 21. The other end of connecting rod 21 is pivotally connected to one arm of bell crank 23. The other arm of bell crank 23 is pivotally connected to piston 24 of pneumatic actuator 26. Pneumatic actuator 26 is pivotally connected by means of linkage 27 to vertical support plate 14.

In the upright or normal position of the seat shown in FIG. 1 the center line of connecting rod 21 passes through pivot point C of bell crank 23. In this condition connecting rod 21 overlaps bell crank 23. In the supinating position of the seat shown in FIG. 2 the center line of connecting rod 21 also passes through pivot point C but, as is apparent in the drawing, the entire length of connecting rod 21 extends away from bell crank 23. The positions in which the center line of connecting rod 21 passes through pivot point C are dead on positions and are positions of zero velocity. This construction insures that actuation of bell crank 23 by the outward motion of piston 24 will transmit a motion through connecting rod 21 to back portion 11 which causes back portion 11 to rotate in a clockwise direction about fixed pivot point B.

The mechanical linkage described above on actuation by piston 23 causes a smooth change from zero velocity of back portion 11 from the overlap position of rod 21 to a maximum velocity when back portion 11 has completed one half of its rotation to the supinating position. As back portion 11 completes the second half of its rotation to the supinating position a smooth change in velocity from maximum to zero velocity is effected.

The connecting rod 21, piston 24, and bell crank 23 provide a smooth start and stop of back portion 11 as it rotates to or from the normal or upright position from or to the supinating position at the ends of the strokes of piston 24.

In the supinating movement seat portion 12 and back portion 11 rotate about movable pivot point A as it moves to the position shown in FIG. 2. Pivot point A is located just below the hip joints of a pilot in the seat. Also guard rods 28 and 29 come together and provide against further rotation of portions 11 and 12 about pivot point A. At the same time follower rod 17 is carried to the position shown in FIG. 2 and provides further support from the seat portion 12 in the supinating position. During actual rotation of the seat follower rod 17 provides proper rotation of the seat portion 12 with respect to the back portion 11 to insure complete transition to the supinating position.

Referring now to FIG. 3, there is shown in schematic representation the control system for actuating pneumatic actuator 26 whereby the seat is moved to and from the supinating position. A rotary valve of the conventional type having a valve housing 42 and a rotating element 43 has an inlet at 44 for receiving air under pressure from air supply 46. Valve 42 has an outlet at 47 which is connected to pneumatic actuator valve 39 via air line 48. Valve housing 42 has a second outlet at 49 which is connected to pneumatic actuator valve 37 via air line 51. Valve housing 42 has a third outlet at 52 which acts as an exhaust or bleeder valve.

Pneumatic actuator valves 37 and 39 are of the free flow in-restraint flow out type. Thus, when air is being supplied to pneumatic actuator 26 via line 51 and valve 37, valve element 37a is in the open position and allows free flow of air into pneumatic actuator 26 to force piston 24 to the extended position. As piston 24 is moving to the extended position valve element 39a is in the closed position. However, orifice 39b allows the entrapped air in pneumatic actuator 26 to be bled off in a controlled manner. Valve element 37a has an orifice 37b for bleeding off the trapped air in pneumatic actuator 26 when piston 24 is in a downward stroke when air is being forced into pneumatic actuator 26 via valve 39. Orifices 37b and 39b provide for a smooth motion of pneumatic actuator 26 wherby piston 24 provides a constant force.

When valve element 43 is in the position shown air supply 46 is directly connected to valve 39 via inlet 44, outlet 47 and air line 48. When valve element 43 is rotated counterclockwise air supply 46 is connected to valve 37 via inlet 44, outlet 49 and air line 51. When this happens piston 24 is forced to the extended position and exhaust or bleeder valve 52 is connected to valve 39 via line 48 and outlet 47. When valve outlet 43 is rotated clockwise to the position shown the air supply 46 is again connected to valve 39 thereby forcing piston 24 into the retracted position. When this happens, exhaust valve 52 is connected to valve 37.

The manner in which valve element 43 is rotated either manually or by an acceleration responsive element is discussed hereinbelow. The shaft 54 of valve element 43 is connected to "G" controlled arm 53 for rotation thereby. Arm 53 has a mass 56 at one end and a spring 57 connects the other end of arm 53 to a stationary portion of the airframe. Thus, "G" controlled arm 53 is spring loaded in the position shown. The spring 57 has a low rate and is loaded to overbalance the mass 56 of the "G" controlled arm minus friction up to 3.5 "G" at which point the arm moves counterclockwise thereby causing element 43 to rotate clockwise which causes the air supply 46 to be connected to valve 37 of pneumatic actuator 26. This causes piston 24 to assume the extended position thereby forcing the seat into the supinating position. When 3.0 "G's" or less is acting on the "G" controlled arm, the spring 57 overpowers the arm force plus friction at which point arm 53 goes back into the position shown to connect valve 39 with the air supply 46 thereby causing piston 24 to be retracted. Thus seat 10 is normally in the upright position.

Valve 41 may also be actuated manually by operation of lever 58 which is mechanically connected to one end of rod 59 which is pivoted at point 61. The other end of rod 59 abuts extending portion 62 of arm 53. Thus, when arm 58 is operated to the supinate position, rod 59 rotates about pivot point 61 and actuates arm 53 against load spring 57 to thereby rotate valve element 43 in a counterclockwise direction which connects the air supply 46 to valve 37. Upon operating arm 58 back to the upright position and providing that the acceleration force is not in excess of 3.5 "G", valve element 43 is again rotated back to the posiiton shown which causes piston 24 to retract and actuate the seat back to the normal or upright position.

For conditions where is is desirable to prevent actuation of the seat into the supinating position, for example, on landing and takeoff of the aircraft, a detent 63 may be provided for engagement with shoulder 66 of arm 53. In the position shown detent 63 causes "G" controlled arm 53 to remain in the position shown regardless of the acceleration forces acting on mass 56. When arm 67 is operated to the right, "G" controlled arm 53 is then freed for actuation responsive to acceleration forces acting on mass 56.

Obviously many modifications and variations of the present invention are possible in the light of the above teachings. It is, therefore, to be understood that within the scope of the appended claims the invention may be practiced otherwise than as specifically described.

What is claimed is:

1. In an aircraft capsule structure:

a pilot's seat having a back portion pivotally connected to a seat portion, fluid actuator means including piston means connected to said back portion for actuating said pilot's seat to and from a supinating position, first and second valve means disposed respectively at each end of said fluid actuator means, fluid supply means, third valve means including a movable element having a first position for connecting said fluid supply means to said first valve means and a second position for connecting said fluid supply means to said second valve means, acceleration responsive means including arm means connected to said movable element for moving said movable element to said first position when aircraft acceleration is above a predetermined value and to said second position when aircraft acceleration is below a predetermined value to actuate said piston means to an extended position for accelerations above a predetermined value and to a retracted position for accelerations below a predetermined value, said acceleration responsive means including manual means connected to said arm means for moving said movable element to said first position, detent means manually engageable with said arm means for preventing movement of said movable element at any acceleration.

2. In an aircraft capsule structure:

a pilot's seat having a back portion pivotally connected to a seat portion, pneumatic actuator means including piston means connected to said back portion for actuating said pilot's seat to and from a supinating position, first and second valve means disposed respectively at each end of said pneumatic actuator means, air supply means, rotary valve means including a rotatable element having a first position for connecting said air supply means to said first valve means and a second position for connecting said air supply means to said second valve means, control means including arm means having a mass at one end, said arm means operably connected to said rotatable element whereby said rotatable element is rotated to said first position when the acceleration forces acting on said mass are above a predetermined value and to said second position when the accleration forces acting on said mass are below a predetermined value.

3. The apparatus of claim 2 in which:
said control means further includes manual means connected to said arm means whereby said rotatable element may be manually rotated to said first position.

4. A supinating pilot's seat, comprising in combination:
a back portion contoured to fit the natural S curve of the back of an occupant,
a seat portion pivotally connected to said back portion at a point below an occupant's hips,
vertical support means,
frame means connected to said vertical support means,
first means pivotally connecting said back portion to said frame at a point near the shoulders of an occupant,
bell crank means pivotally connected to said frame means at a point below and laterally of said first means,
connecting rod means pivotally connected between one arm of said bell crank means and a point near the lower end of said back portion,
follower rod means pivotally connected between said seat portion below the point where said seat portion is connected to said back portion and said vertical support means above the point where said seat portion is connected to said back portion,
pneumatic actuator means pivotally connected at one end to said vertical support means, said pneumatic actuator means including piston means projecting from the other end of said pneumatic actuator means,
second means pivotally connecting said piston means to the other arm of said bell crank means,
control means operatively connected to said pneumatic actuator means for extending and retracting said piston means into and out of said pneumatic actuator means,
whereby said connecting rod means rotates said seat about said first means to and from a supinating position.

5. A supinating pilot's seat, comprising in combination:
a back portion contoured to fit the natural S curve of the back of an occupant,
a seat portion pivotally connected to said back portion at a point below an occupant's hips,
vertical support means,
frame means connected to said vertical support means,
first means pivotally connecting said back portion to said frame at a point near the shoulders of an occupant,
bell crank means pivotally connected to said frame means at a point below and laterally of said first means,
connecting rod means pivotally connected between one arm of said bell crank means and a point near the lower end of said back portion,
follower rod means pivotally connected between said seat portion below the point where said seat portion is connected to said back portion and said vertical support means above the point where said seat portion is connected to said back portion,
pneumatic actuator means pivotally connected at one end to said vertical support means, said pneumatic actuator means including piston means projecting from the other end of said pneumatic actuator means,
second means pivotally connecting said piston means to the other arm of said bell crank means,
valve means disposed at each end of said pneumatic actuator means,
air supply means,
acceleration responsive means for alternately connecting said air supply means to one of said valve means when aircraft acceleration is above a predetermined value and to the other of said valve means when aircraft acceleration is below a predetermined value,
whereby said connecting rod means rotates said seat about said first means to and from a supinating position.

6. A supinating pilot's seat, comprising in combination:
a back portion contoured to fit the natural S curve of the back of an occupant,
a seat portion pivotally connected to said back portion at a point below an occupant's hips,
vertical support means,
frame means connected to said vertical support means,
first means pivotally connecting said back portion to said frame at a point near the shoulders of an occupant,
bell crank means pivotally connected to said frame means at a point below and laterally of said first means,
connecting rod means pivotally connected between one arm of said bell crank means and a point near the lower end of said back portion,
follower rod means pivotally connected between said seat portion below the point where said seat portion is connected to said back portion and said vertical support means above the point where said seat portion is connected to said back portion,
fluid actuator means pivotally connected at one end to said vertical support means, said fluid actuator means including piston means projecting from the other end of said fluid actuator means,
second means pivotally connecting said piston means to the other arm of said bell crank means,
first and second valve means disposed respectively at each end of said fluid actuator means,
fluid supply means,
third valve means having an inlet connected to said fluid supply means and an outlet connected to each of said first and second valve means,
said third valve means including a movable element having alternate positions for opening one or the other of said outlets to said fluid supply means,
control means connected to said movable element operative to actuate said movable member to said alternate positions to connect one or the other of said first and second valve means to said fluid supply means whereby said piston means is extended or retraced to cause said connecting rod means to rotate said seat about said first means to and from a supinating position.

7. The apparatus of claim 6 in which,
said control means includes acceleration responsive means whereby said movable element connects one of said first or second valve means to said fluid supply means when the acceleration is above a predetermined value and the other of said first or second valve means to said fluid supply means when the acceleration is below a predetermined value.

8. The apparatus of claim 7 in which,
said control means includes manual means whereby said movable element may be manually operated to connect one or the other of said first and second valve means to said fluid supply means.

9. A supinating pilot's seat, comprising in combination:
a back portion contoured to fit the natural S curve of the back of an occupant, a seat portion pivotally connected to said back portion at a point below an occupant's hips,
a vertical support means,
frame means connected to said vertical support means,
first means pivotally connecting said back portion to said frame at a point near the shoulders of an occupant,
bell crank means pivotally connected to said frame means at a point below and laterally of said first means,
connecting rod means pivotally connected between one arm of said bell crank means and a point near the lower end of said back portion,
follower rod means pivotally connected between said seat portion below the point where said seat portion is connected to said back portion and said vertical support means above the point where said seat portion is connected to said back portion,
fluid actuator means pivotally connected connected at one end to said vertical support means, said fluid actuator means including piston means projecting from the other end of said fluid actuator means,
second means pivotally connecting said piston means to the other arm of said bell crank means,
first and second valve means disposed respectively at each end of said fluid actuator means,
fluid supply means,
third valve means including a movable element having a first position for connecting said fluid supply means to said first valve means and a second position for connecting said fluid supply means to said second valve means,
acceleration responsive means connected to said movable element for moving said movable element to said first position when aircraft acceleration is above a predetermined value and to said second position when aircraft acceleration is below a predetermined value whereby said piston means is actuated to an extended position for accelerations above a predetermined value and to a retracted position for accelerations below a predetermined value to cause said connecting rod to rotate said seat about first means to and from a supinating position.

10. A supinating pilot's seat, comprising in combination:
a back portion contoured to fit the natural S curve of the back of an occupant,
a seat portion pivotally connected to said back portion at a point below an occupant's hips,
vertical support means,
frame means connected to said vertical support means,
first means pivotally connecting said back portion to said frame at a point near the shoulders of an occupant,
bell crank means pivotally connected to said frame means at a point below and laterally of said first means,
connecting rod means pivotally connected between one arm of said bell crank means and a point near the lower end of said back portion,
follower rod means pivotally connected between said seat portion below the point where said seat portion is connected to said back portion and said vertical support means above the point where said seat portion is connected to said back portion,
pneumatic actuator means pivotally connected at one end to said vertical support means, said pneumatic actuator means including piston means projecting from the other end of said pneumatic actuator means,
second means pivotally connecting said piston means to the other arm of said bell crank means,
first and second valve means disposed respectively at each end of said pneumatic actuator means,
air supply means,
rotary valve means including a rotatable element having a first position for connecting said air supply means to said first valve means and a second position for connecting said air supply means to said second valve means,
control means including arm means having a mass at one end, said arm means operably connected to said rotatable element whereby said rotatable element is rotated to said first position when the acceleration forces acting on said mass are above a predetermined value and to said second position when the acceleration forces acting on said mass are below a predetermined value to actuate said piston means to and from an extended position.

11. In an aircraft capsule structure:
pneumatic actuator means including piston means for actuating a pilot's seat to and from a supinating position,
first and second valve means disposed respectively at each end of said pneumatic actuator means,
air supply means,
rotary valve means including a rotatable element having a first position for connecting said air supply means to said first valve means and a second position for connecting said air supply means to said second valve means,
control means including arm means having a mass at one end,
said arm means operably connected to said rotatable element for rotating said rotatable element to said first position when the acceleration forces acting on said mass are above a predetermined value and to said second position when the acceleration forces acting on said mass are below a predetermined value,
said control means including manual means connected to said arm means for rotating said rotatable element to said first position,
detent means manually engageable with said arm means for preventing rotation of said rotatable element at any acceleration.

References Cited in the file of this patent

UNITED STATES PATENTS

| | | |
|---|---|---|
| 2,199,966 | Timm | May 7, 1940 |
| 2,222,886 | Voigt | Nov. 26, 1940 |
| 2,284,509 | Boes et al. | May 26, 1942 |
| 2,304,781 | Dillon | Dec. 15, 1942 |
| 2,379,385 | Styers | June 26, 1945 |
| 2,433,950 | Henderson | Jan. 6, 1948 |
| 2,628,793 | Stalker | Feb. 17, 1953 |

FOREIGN PATENTS

| | | |
|---|---|---|
| 98,997 | Sweden | May 28, 1940 |
| 862,649 | France | Dec. 16, 1940 |
| 549,385 | Italy | Oct. 12, 1956 |